US008681280B2

(12) United States Patent
Son (10) Patent No.: US 8,681,280 B2
(45) Date of Patent: Mar. 25, 2014

(54) STEREOSCOPIC IMAGE DISPLAY AND METHOD FOR DRIVING THE SAME

(75) Inventor: Hyeonho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 13/086,920

(22) Filed: Apr. 14, 2011

(65) Prior Publication Data

US 2011/0255019 A1 Oct. 20, 2011

(30) Foreign Application Priority Data

Apr. 20, 2010 (KR) ........................ 10-2010-0036286

(51) Int. Cl.
*G02F 1/1335* (2006.01)
*H04N 13/04* (2006.01)
*G02B 27/26* (2006.01)

(52) U.S. Cl.
USPC ................................ 349/15; 348/51; 359/465

(58) Field of Classification Search
USPC ............ 349/15; 348/51, 54, 55; 359/464, 465
See application file for complete search history.

(56) References Cited

U.S. PATENT DOCUMENTS

| 4,792,850 | A | * | 12/1988 | Liptoh et al. | ................... | 348/57 |
| 2007/0229951 | A1 | * | 10/2007 | Jung et al. | ................... | 359/465 |
| 2008/0316303 | A1 | * | 12/2008 | Chiu et al. | ................... | 348/51 |
| 2011/0018983 | A1 |   | 1/2011 | Kim et al. |  |  |
| 2011/0279659 | A1 | * | 11/2011 | Jung | ............................. | 348/54 |

FOREIGN PATENT DOCUMENTS

KR 2011-0009504 1/2011

OTHER PUBLICATIONS

Unpublished U.S. Appl. No. 12/123,456.
Unpublished U.S. Appl. No. 12/829,174.

* cited by examiner

*Primary Examiner* — Edward Glick
*Assistant Examiner* — David Chung
(74) *Attorney, Agent, or Firm* — Morgan, Lewis & Bockius LLP

(57) ABSTRACT

A stereoscopic image display and a method for driving the same are disclosed. The stereoscopic image display includes a display element to which data of a left eye image is written during a data scanning time of the left eye image and data of a right eye image is written during a scanning time of the right eye image, an active retarder cell positioned on a display surface of the display element, and shutter glasses including a left eye shutter and a right eye shutter that are electrically controlled and are alternately opened and closed. The active retarder cell converts a polarization characteristic of light from the display element during an active retarder scanning time.

17 Claims, 8 Drawing Sheets

STEREOSCOPIC IMAGE DISPLAY AND METHOD FOR DRIVING THE SAME

This application claims the benefit of Korea Patent Application No. 10-2010-0036286 filed on Apr. 20, 2010, the entire contents of which is incorporated herein by reference for all purposes as if fully set forth herein.

BACKGROUND OF THE INVENTION

1. Field of the Invention

Embodiments of the invention relate to a stereoscopic image display and a method for driving the same.

2. Discussion of the Related Art

A stereoscopic image display is classified into a display using a stereoscopic technique and a display using an autostereoscopic technique.

The stereoscopic technique, which uses a parallax image between left and right eyes of a user with a high stereoscopic effect, includes a glasses type method and a non-glasses type method, both of which have been put on the market. In the glasses type method, the parallax image between the left and right eyes is displayed on a direct-view display or a projector through a change in a polarization direction of the left and right parallax image or in a time-division manner, and thus a stereoscopic image is implemented using polarization glasses or shutter glasses. In the non-glasses type method, an optical axis of the parallax image between the left and right eyes is generally separated using an optical plate such as a parallax barrier and a lenticular lens, and thus the stereoscopic image is implemented.

In a stereoscopic image display using polarization glasses, an active retarder cell has to be attached to a display element. The active retarder cell includes a liquid crystal layer and electrodes for applying an electric field to the liquid crystal layer. The active retarder cell electrically controls birefringent properties of the liquid crystal layer, thereby converting polarization characteristic of light coming from the display element. For example, when a left eye image is displayed on the display element, the active retarder cell converts polarization characteristic of light coming from the display element into a first polarization. Further, when a right eye image is displayed on the display element, the active retarder cell converts the polarization characteristic of the light coming from the display element into a second polarization. The polarization glasses include a left eye polarization filter transmitting only light having the first polarization and a right eye polarization filter transmitting only light having the second polarization. Thus, the user wearing the polarization glasses views the left eye image through the left eye polarization filter and views the right eye image through the right eye polarization filter in the time-division manner. Namely, the user wearing the polarization glasses may view the stereoscopic image.

The stereoscopic image display using the polarization glasses addresses data of the left eye image or data of the right eye image to the display element, and at the same time, scans the active retarder cell without considering a response delay time between the display element and the active retarder cell. Thus, when the stereoscopic image display using the polarization glasses uses a liquid crystal display element having slow response characteristic, a crosstalk, in which the user views doubled image by leaking part of the left eye image into the right eye image and vice versa, may be generated. Further, the image quality of the stereoscopic image display may be reduced because a luminance varies depending on a location of the liquid crystal display element.

A stereoscopic image display using shutter glasses does not require the active retarder cell. The shutter glasses include a left eye shutter and a right eye shutter, each of which electrically controls birefringent properties of liquid crystals. When a left eye image is displayed on the display element, only the left eye shutter is open. When a right eye image is displayed on the display element, only the right eye shutter is open. Thus, the user wearing the shutter glasses views the left eye image through the left eye shutter and views the right eye image through the right eye shutter in the time-division manner. Namely, the user wearing the shutter glasses may view the stereoscopic image.

The user wearing the polarization glasses cannot view the stereoscopic image through the stereoscopic image display not having the active retarder cell. Further, the user wearing the shutter glasses cannot view the stereoscopic image through the stereoscopic image display having the active retarder cell.

SUMMARY OF THE INVENTION

Embodiments of the invention provide a stereoscopic image display and a method for driving the same capable of improving the quality of a stereoscopic image.

In one aspect, there is a stereoscopic image display comprising a display element to which data of a left eye image is written during a data scanning time of the left eye image and data of a right eye image is written during a data scanning time of the right eye image, an active retarder cell positioned on a display surface of the display element, the active retarder cell configured to convert a polarization characteristic of light from the display element during an active retarder scanning time, and shutter glasses including a left eye shutter and a right eye shutter that are electrically controlled and are alternately opened and closed.

After a predetermined time has passed from the end of the data scanning time of the left eye image, the active retarder cell starts to be scanned. Further, after a predetermined time has passed from the end of the data scanning time of the right eye image, the active retarder cell starts to be scanned.

In another aspect, there is a method for driving a stereoscopic image display comprising writing data of a left eye image to a display element during a data scanning time of the left eye image and writing data of a right eye image to the display element during a data scanning time of the right eye image, scanning an active retarder cell positioned on a display surface of the display element during an active retarder scanning time to convert a polarization characteristic of light from the display element, and electrically controlling a left eye shutter and a right eye shutter of shutter glasses to alternately open and close the left eye shutter and the right eye shutter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 1:
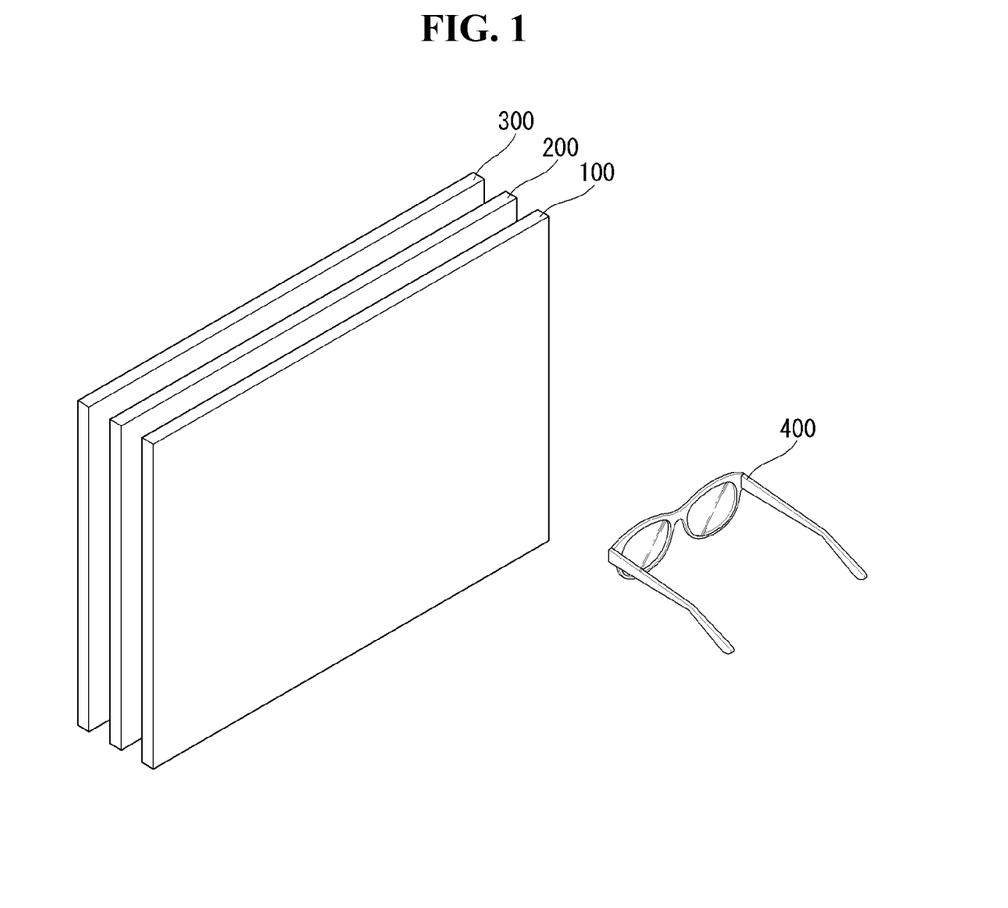
FIG. 1 is a perspective view of a stereoscopic image display according to an exemplary embodiment of the invention.
Figure 2:
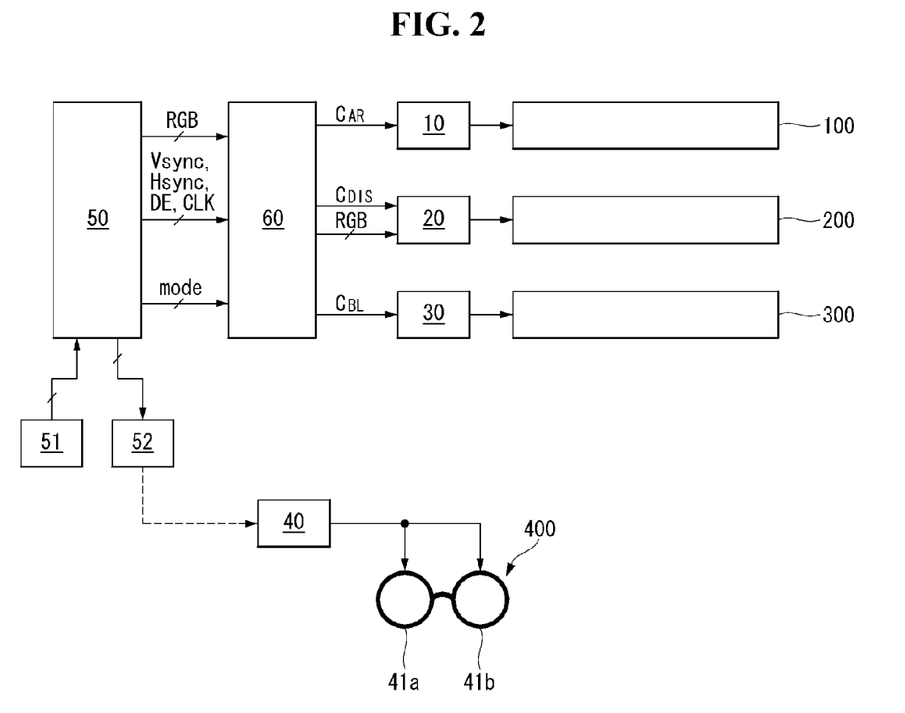
FIG. 2 is a block diagram of a stereoscopic image display according to an exemplary embodiment of the invention.

As shown in FIGS. 1 and 2, a stereoscopic image display according to an exemplary embodiment of the invention includes a display element 200, an active retarder cell 100 positioned on a display surface of the display element 200, and shutter glasses 400.

The display element 200 displays a two-dimensional (2D) image and a three-dimensional (3D) image. The display element 200 may be implemented by a display element of any one of a liquid crystal display (LCD), a field emission display (FED), a plasma display panel (PDP), an electroluminescence device (EL) including an inorganic electroluminescence device and an organic light emitting diode (OLED), and an electrophoretic display (EPD). Other display elements may be used. Hereinafter, the display element 200 is described using the display element of the liquid crystal display as an example of the display element 200. A backlit liquid crystal display includes a backlight unit 300 for providing light to the display element 200.

The display element 200 of the backlit liquid crystal display includes a thin film transistor (TFT) array substrate and a color filter array substrate. A liquid crystal layer is formed between the TFT array substrate and the color filter array substrate. The TFT array substrate includes data lines and gate lines (or scan lines) that cross each other, a TFT formed at each of crossings of the data lines and the gate lines, pixel electrodes arranged in a matrix form defined by the data lines and the gate lines, storage capacitors for holding a voltage of liquid crystal cells, and the like. The TFT transfers a data voltage supplied via the data lines to the pixel electrode of the liquid crystal cell in response to a scan pulse from the gate line. The color filter array substrate includes black matrixes, color filters, and the like. In a vertical electric field driving manner such as a twisted nematic (TN) mode and a vertical alignment (VA) mode, a common electrode is formed on the color filter array substrate. In a horizontal electric field driving manner such as an in-plane switching (IPS) mode and a fringe field switching (FFS) mode, the common electrode is formed on the TFT array substrate along with the pixel electrode. Polarizing plates are respectively attached to the TFT array substrate and the color filter array substrate. Alignment layers for setting a pre-tilt angle of liquid crystals are respectively formed on the TFT array substrate and the color filter array substrate. A spacer is formed between the TFT array substrate and the color filter array substrate, thereby keeping cell gaps of the liquid crystal layers constant.

Figure 5:
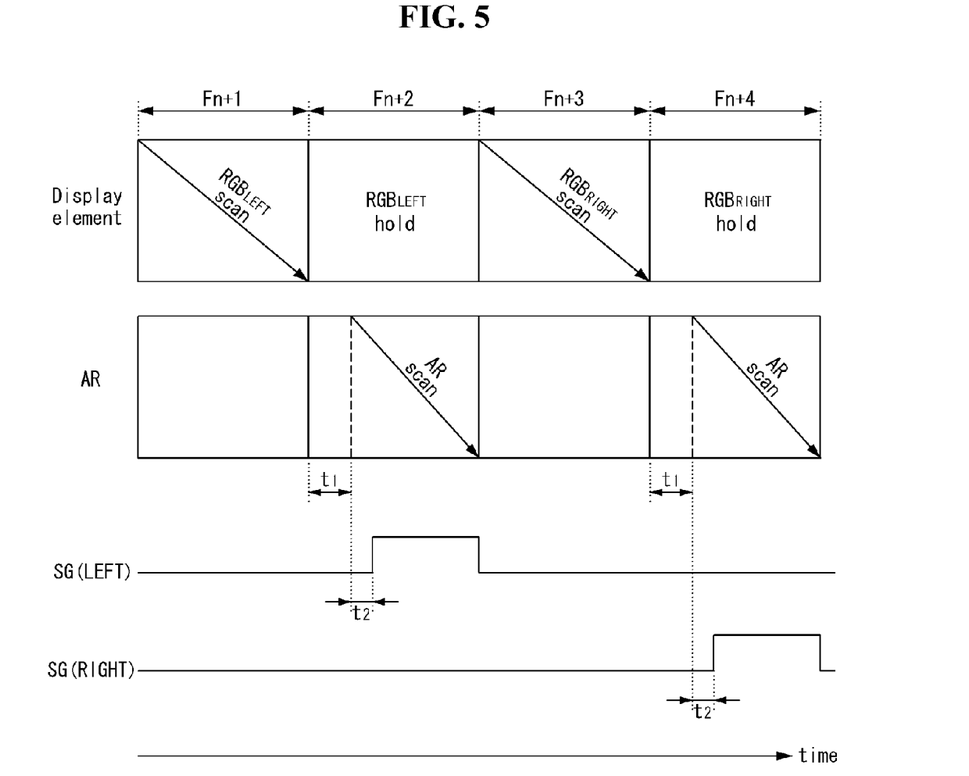
FIG. 5 is a timing diagram illustrating an operation of a stereoscopic image display according to an exemplary embodiment of the invention.

Data of a left eye image is written to the display element 200 during a data scanning time of the left eye image, and data of a right eye image is written to the display element 200 during a data scanning time of the right eye image. As shown in FIG. 5, the data scanning time of the left eye image may be included in an (n+1)th frame period Fn+1, and the data scanning time of the right eye image may be included in an (n+3)th frame period Fn+3, where n is a positive integer.

The backlight unit 300 may be implemented by one of an edge type backlight unit and a direct type backlight unit. Light sources of the backlight unit 300 may include one or two or more of a hot cathode fluorescent lamp (HCFL), a cold cathode fluorescent lamp (CCFL), an external electrode fluorescent lamp (EEFL), and a light emitting diode (LED).

The active retarder cell 100 includes a liquid crystal layer and electrodes for applying an electric field to the liquid crystal layer. The active retarder cell 100 electrically controls birefringent properties of the liquid crystal layer, thereby converting polarization characteristic of light coming from the display element 200. The active retarder cell 100 converts the polarization characteristic of the light coming from the display element 200 into the same polarization during a scanning time of the active retarder cell 100 (hereinafter, referred to as "active retarder scanning time"). For example, the active retarder cell 100 converts the light from the display element 200 into left circularly polarized light or right circularly polarized light during the active retarder scanning time. As shown in FIG. 5, the active retarder scanning time may be included in an (n+2)th frame period Fn+2 and an (n+4)th frame period Fn+4. After a predetermined time has passed from the end of the data scanning time of the left eye image, the active retarder cell 100 starts to be scanned. After a predetermined time has passed from the end of the data scanning time of the right eye image, the active retarder cell 100 starts to be scanned.

The shutter glasses 400 include a left eye shutter 41a and a right eye shutter 41b which are separately controlled electrically. Each of the left eye shutter 41a and the right eye shutter 41b includes a first transparent substrate, a first transparent electrode formed on the first transparent substrate, a second transparent substrate, a second transparent electrode formed on the second transparent substrate, a liquid crystal layer interposed between the first and second transparent substrates, and polarization filters respectively attached to the first and second transparent substrates. A reference voltage is supplied to the first transparent electrode, and an ON or OFF voltage are supplied to the second transparent electrode. When the ON voltage is supplied to the second transparent electrode of each of the left and right eye shutters 41a and 41b, each of the left and right eye shutters 41a and 41b transmits a predetermined polarization of light coming from the active retarder cell 100 to user's eyes. On the other hand, when the OFF voltage is supplied to the second transparent electrode of each of the left and right eye shutters 41a and 41b, each of the left and right eye shutters 41a and 41b blocks the light from the active retarder cell 100.

The stereoscopic image display according to the exemplary embodiment of the invention includes an active retarder driving circuit 10, a display element driving circuit 20, a backlight driving circuit 30, a controller 60, and a system board 50.

The display element driving circuit 20 includes a data driving circuit and a gate driving circuit. The data driving circuit converts data RGB of the left and right eye images received from the controller 60 into positive and negative analog gamma compensation voltages and generates positive and negative analog data voltages. The data driving circuit then supplies the positive and negative analog data voltages to the data lines of the display element 200. The gate driving circuit sequentially supplies a gate pulse (or scan pulse) synchronized with the positive and negative analog data voltages to the gate lines of the display element 200.

As shown in FIG. 5, in a 3D mode, the display element driving circuit 20 addresses left eye image data $RGB_{LEFT}$ to the display element 200 during the (n+1)th frame period Fn+1 and then addresses right eye image data $RGB_{RIGHT}$ to the display element 200 during the (n+3)th frame period Fn+3. During the (n+2)th frame period Fn+2, pixels of the display element 200 are hold at a left eye image data voltage, that has been charged during the previous (n+1)th frame period Fn+1. Further, during the (n+4)th frame period Fn+4, the pixels of the display element 200 are hold at a right eye image data voltage, that has been charged during the previous (n+3)th frame period Fn+3.

As shown in FIG. 5, in the 3D mode, after a predetermined first time t1 has passed from the beginning of the (n+2)th frame period Fn+2, the active retarder driving circuit 10 scans the active retarder cell 100 under the control of the controller 60. The first time t1 is a response delay time of the display element 200 and is set to be greater than zero and less than one half of the frame period. Further, after the first time t1 has passed from the beginning of the (n+4)th frame period Fn+4, the active retarder driving circuit 10 scans the active retarder cell 100 under the control of the controller 60.

The backlight driving circuit 30 generates a driving power for turning on the light sources of the backlight unit 300. The backlight driving circuit 30 continuously keeps the light sources in a turned-on state in the 3D mode. Alternatively, the backlight driving circuit 30 may periodically switch on or off the driving power supplied to the light sources, so as to periodically turn on off light sources of a backlight unit disclosed in detail in Korean Patent Application Nos. 10-2009-0066935 (Jul. 22, 2009) and 10-2009-0107047 (Nov. 6, 2009) corresponding to the present applicant, which are hereby incorporated by reference in their entirety.

The controller 60 receives timing signals and digital video data RGB from the system board 50. The timing signals include a vertical sync signal Vsync, a horizontal sync signal Hsync, a data enable DE, a dot clock CLK, and the like. The controller 60 multiplies an input frame frequency by 'N', where N is a positive integer equal to or greater than 2, and controls an operation timing of each of the active retarder driving circuit 10, the display element driving circuit 20, and the backlight driving circuit 30 based on the multiplied frame frequency. The input frame frequency is 50 Hz in a phase alternate line (PAL) manner and is 60 Hz in a national television standards committee (NTSC) manner.

The controller 60 generates a data control signal for controlling an operation timing of the data driving circuit and a gate control signal for controlling an operation timing of the gate driving circuit, so as to control an operation timing of the display element driving circuit 20. The data control signal includes a source start pulse SSP, a source sampling clock SSC, a source output enable SOE, a polarity control signal POL, and the like. The source start pulse SSP controls a data sampling start time of the data driving circuit. The source sampling clock SSC controls a sampling operation of the data driving circuit based on a rising or falling edge. If the digital video data RGB to be input to the data driving circuit is transferred based on a mini low voltage differential signaling (LVDS) interface standard, the source start pulse SSP and the source sampling clock SSC may be omitted. The polarity control signal POL periodically inverts a polarity of the data voltage output from the data driving circuit. The source output enable SOE controls an output timing of the data driving circuit. The gate control signal includes a gate start pulse GSP, a gate shift clock GSC, a gate output enable GOE, and the like. The gate start pulse GSP controls an operation timing of a first gate pulse. The gate shift clock GSC is a clock for shifting the gate start pulse GSP. The gate output enable GOE controls an output timing of the gate driving circuit.

The system board 50 performs graphic processing on data of input image received from an external equipment (not shown) or a broadcasting signal receiving circuit (not shown) and changes a resolution of the image data in conformity with a resolution of the display element 200 using a scaler (not shown). The system board 50 transfers digital video data output from the scaler and the timing signals Vsync, Hsync, DE, and CLK to the controller 60. The system board 50 may transfer mode signals respectively corresponding to the 2D mode and the 3D mode to the controller 60.

The system board 50 is connected to a user input device 51 and a shutter control signal transmission unit 52.

The user may select the 2D mode or the 3D mode using the user input device 51.

The user input device 51 includes a touch screen, an on-screen display (OSD), a keyboard, a mouse, a remote controller, etc. that are attached to or mounted inside the display element 200. The system board 50 may convert a current operation mode into the 2D mode or the 3D mode in response to user data input through the user input device 51 or may convert the operation mode based on the result of an analysis of the input image.

The shutter control signal transmission unit 52 transmits a shutter control signal for opening and closing the left eye shutter 41*a* and the right eye shutter 41*b* of the shutter glasses 400 to a shutter control signal reception unit 40 through a wire or wireless interface under the control of the system board 50.

The shutter control signal reception unit 40 is mounted inside the shutter glasses 400. The shutter control signal reception unit 40 receives the shutter control signal through the wire or wireless interface and alternately opens and closes the left eye shutter 41*a* and the right eye shutter 41*b* of the shutter glasses 400 in response to the shutter control signal.

As shown in FIG. 5, after a predetermined time corresponding to a sum of the first time t1 and a second time t2 has passed from the beginning of the (n+2)th frame period Fn+2, the left eye shutter 41*a* of the shutter glasses 400 is open. Further, after the predetermined time corresponding to a sum of the first time t1 and the second time t2 has passed from the beginning of the (n+4)th frame period Fn+4, the right eye shutter 41*b* of the shutter glasses 400 is open. The second time t2 is a response delay time of the shutter glasses 400.

The controller 60 may supply the gate start pulse GSP, that is initially generated once during one frame period, to the system board 50. After the predetermined time corresponding to the sum of the first time t1 and the second time t2 has passed from the beginning of the one frame period, the system board 50 may open the left eye shutter 41*a* or the right eye shutter 41*b* of the shutter glasses 400 in response to the vertical sync signal Vsync or the gate start pulse GSP.

Figure 3A:
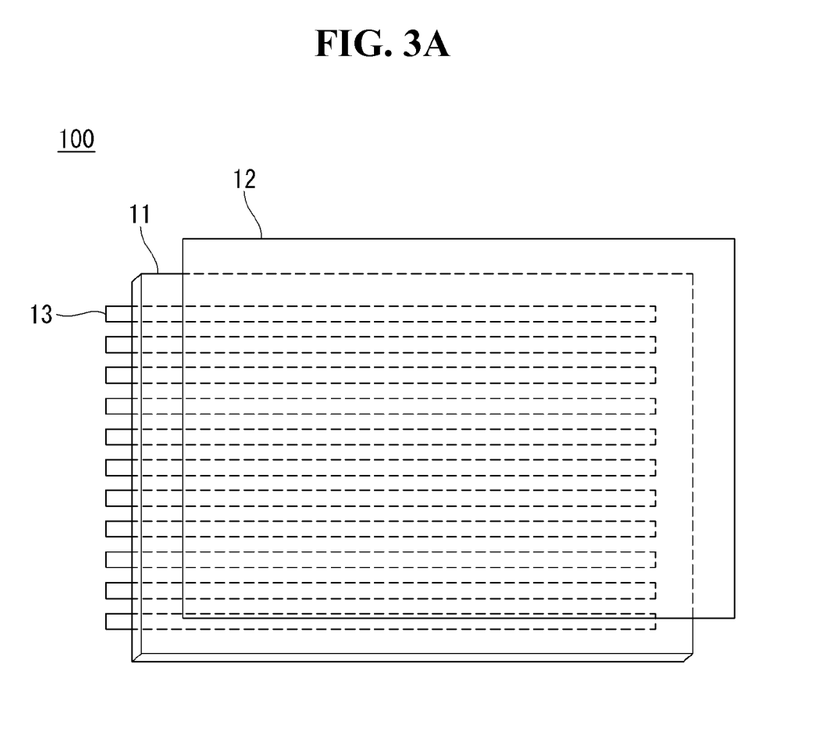
FIG. 3A is an exploded perspective view illustrating a structure of an active retarder cell.
Figure 3B:
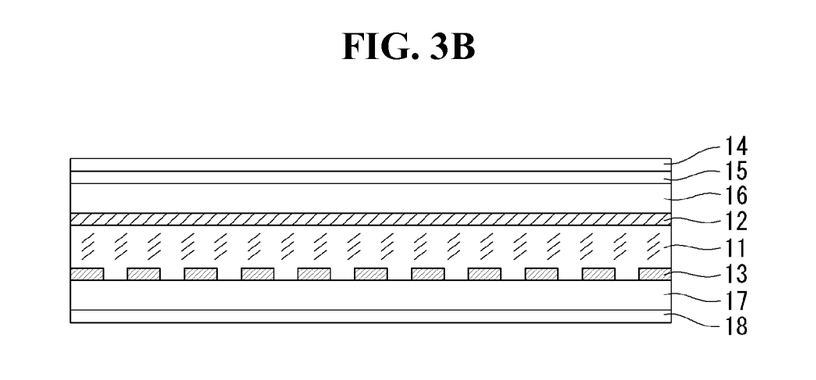
FIG. 3B is a cross-sectional view illustrating a structure of an active retarder cell.

FIGS. 3A and 3B illustrate the structure of the active retarder cell 100.

As shown in FIGS. 3A and 3B, the active retarder cell 100 includes division electrodes 13 formed on a first transparent substrate 17, a common electrode 12 formed on a second transparent substrate 16, and a liquid crystal layer 11 formed between the first transparent substrate 17 and the second transparent substrate 16. The first transparent substrate 17 is attached to an upper polarizing plate 18 of the display element 200. A polarizing plate 15 and a λ/4 plate 14 are stacked on an outer surface of the second transparent substrate 16, where λ is a wavelength of light.

A constant direct current (DC) voltage is applied to the common electrode 12. In a scanning process of the active retarder cell 100, a driving voltage is sequentially applied to the division electrodes 13. The liquid crystal layer 11 is driven by an electric field generated by the driving voltage applied to the division electrodes 13 and the DC voltage applied to the common electrode 12. Linearly polarized light, is retarded by λ/2 because of a driving of the liquid crystals, passes through the polarizing plate 15 and then is converted into circularly polarized light by the λ/4 plate 14. The circularly polarized light then passes through the λ/4 plate 14.

In the 3D mode, light of the left and right eye images displayed on the display element 200 passes through the active retarder cell 100 and is incident on the shutter glasses 400. In this instance, light having the same polarization characteristic is incident on the left eye shutter 41a and the right eye shutter 41b of the shutter glasses 400.

Figure 4:
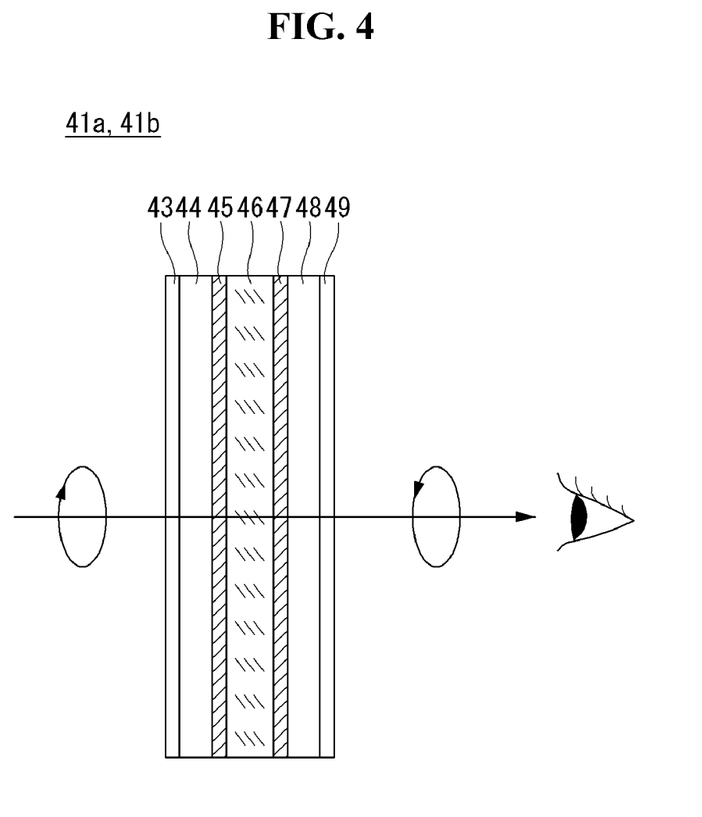
FIG. 4 is a cross-sectional view illustrating a structure of a left eye shutter and a right eye shutter of shutter glasses.

FIG. 4 illustrates the structure of the left eye shutter 41a and the right eye shutter 41b of the shutter glasses 400.

As shown in FIG. 4, each of the left eye shutter 41a and the right eye shutter 41b of the shutter glasses 400 includes a first electrode 45 formed on a first transparent substrate 44, a second electrode 47 formed on a second transparent substrate 48, and a liquid crystal layer 46 formed between the first transparent substrate 44 and the second transparent substrate 48. A λ/4 plate 43 is attached to an outer surface of the first transparent substrate 44, and a polarizing plate 49 is attached to an outer surface of the second transparent substrate 48. A constant DC voltage is supplied to one of the first and second electrodes 45 and 47, and the ON or OFF voltage, that is switched on or off by the shutter control signal received from the shutter control signal reception unit 40, is supplied to the other. When the ON voltage is applied to the first electrode 45 or the second electrode 47, the circularly polarized light from the active retarder cell 100 passes through the liquid crystal layer 46 and the polarizing plate 49. On the other hand, when the OFF voltage is applied to the first electrode 45 or the second electrode 47, the circularly polarized light from the active retarder cell 100 does not pass through the polarizing plate 49.

Figure 6:
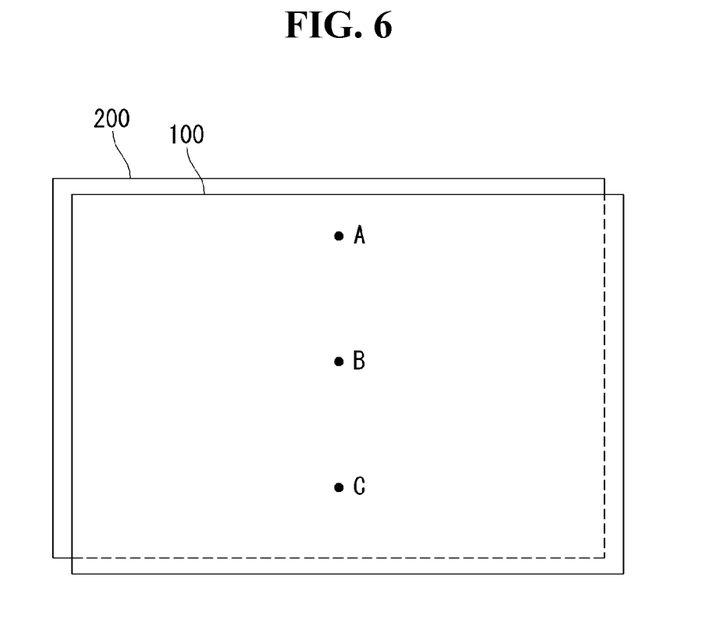
FIG. 6 illustrates any three locations on a display element.
Figure 7:
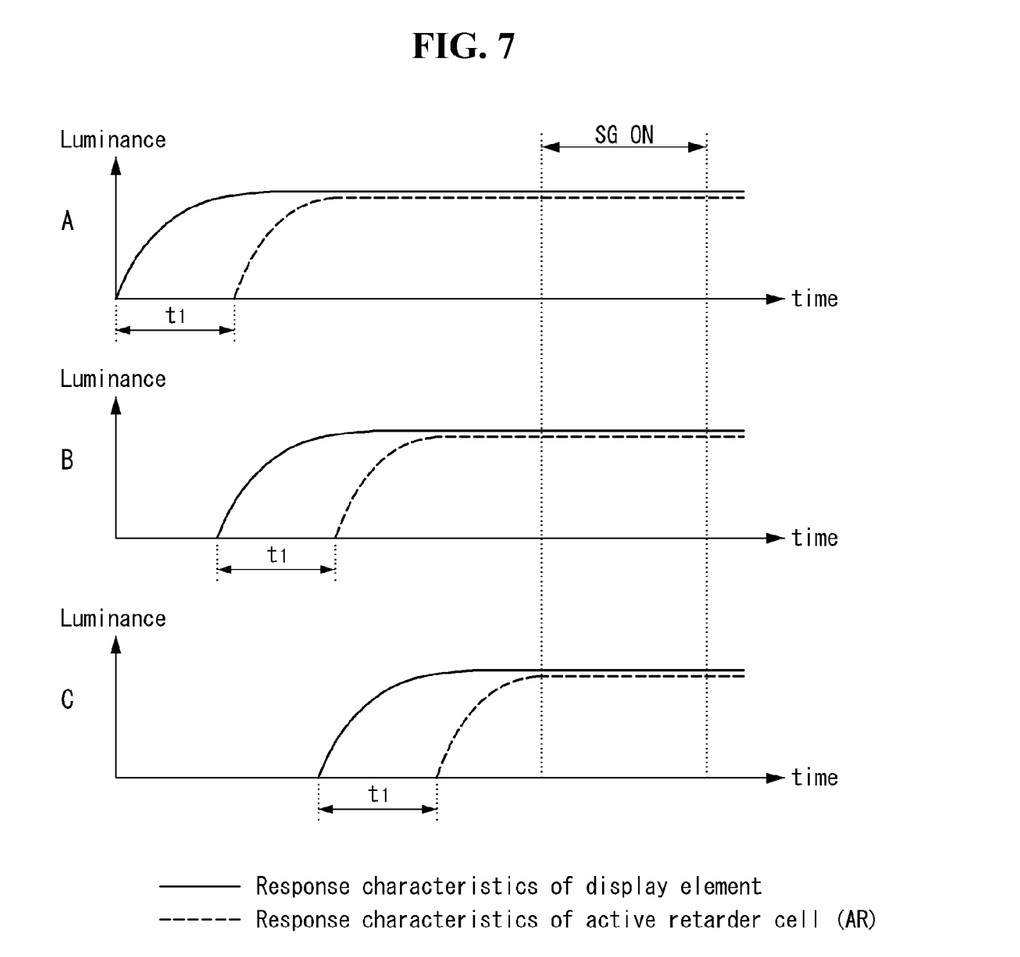
FIG. 7 is a timing diagram illustrating response characteristics of the three locations shown in FIG. 6 in a process for scanning a display element and an active retarder cell.

FIG. 6 illustrates any three locations on the display element 200. FIG. 7 is a timing diagram illustrating response characteristics of the three locations shown in FIG. 6 in a process for scanning the display element 200 and the active retarder cell 100.

As shown in FIGS. 6 and 7, data is written to pixels of any upper location A, any middle location B, and any lower location C of the display element 200 at different times. In the process for scanning 3D data of the display element 200, the data is written to the pixel of the location A, and then the data is written to the pixel of the location B. The data is then the written to the pixel of the location C.

After the first time t1 has passed from a data scanning time of the location A, the driving voltage is applied to an upper line of the active retarder cell 100 corresponding to the pixel of the location A. After the first time t1 has passed from a data scanning time of the location B, the driving voltage is applied to a middle line of the active retarder cell 100 corresponding to the pixel of the location B. After the first time t1 has passed from a data scanning time of the location C, the driving voltage is applied to a lower line of the active retarder cell 100 corresponding to the pixel of the location C. Thus, a difference between the data scanning time of the display element 200 and the scanning time of the active retarder cell 100 is a response delay time of the liquid crystals of the display element 200. The response delay time of the liquid crystals of the display element 200 is uniform at all of locations of the display element 200.

After the scanning of both the display element 200 and the active retarder cell 100 is completed and the response delay time of the display element 200 and the active retarder cell 100 at all of the locations of the display element 200 has passed, the left eye shutter 41a or the right eye shutter 41b of the shutter glasses 400 is open. after Thus, the stereoscopic image display according to the embodiment of the invention sequentially scans lines of the active retarder cell 100 on all of lines of the display element 200 after the passage of the response delay time of the display element 200, thereby uniformizing the image quality of the 3D image passing through the active retarder cell 100. Further, the stereoscopic image display according to the embodiment of the invention opens the shutter glasses 400 on all of the lines of the display element 200 and the active retarder cell 100 after the passage of the response delay time of the display element 200, thereby improving the image quality of the stereoscopic image the user perceives.

Figure 8:
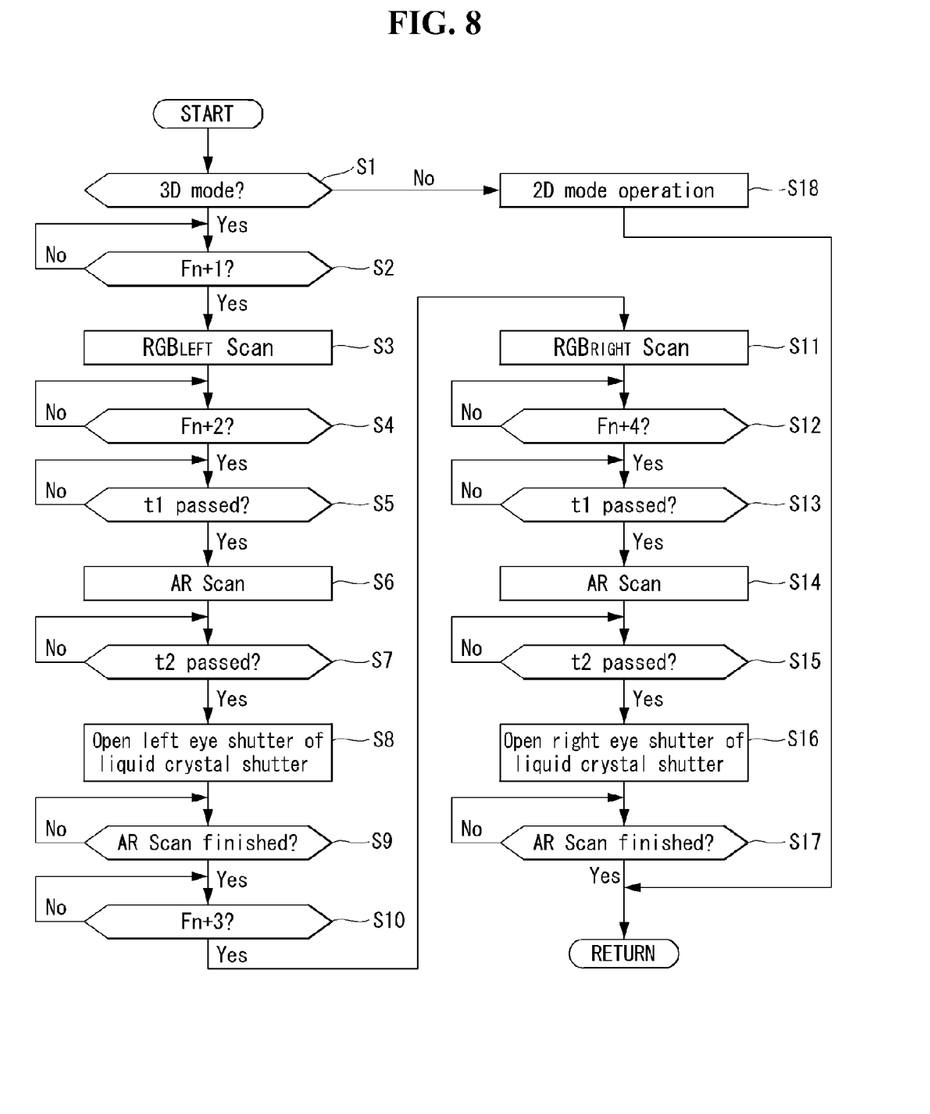
FIG. 8 is a flow chart sequentially illustrating each of stages in a method for driving a stereoscopic image display according to an exemplary embodiment of the invention.

FIG. 8 is a flow chart sequentially illustrating each of stages in a method for driving the stereoscopic image display according to the exemplary embodiment of the invention.

As shown in FIG. 8, the controller 60 selects the 2D mode or the 3D mode based on the mode signal received from the system board 50 or the result of an analysis of the input image in step S1. The controller 60 counts the vertical sync signal Vsync to decide a frame period.

In the 3D mode, the controller 60 writes the left eye image data $RGB_{LEFT}$ to the display element 200 during the (n+1)th frame period Fn+1 in steps S2 and S3. The display element 200 holds the left eye image data $RGB_{LEFT}$ during the (n+2)th frame period Fn+2.

After the first time t1 has passed from the beginning of the (n+2)th frame period Fn+2, the controller 60 scans the active retarder cell 100 in steps S4 to S6. After the predetermined time corresponding to the sum of the first and second times t1 and t2 has passed from the beginning of the (n+2)th frame period Fn+2, the left eye shutter 41a of the shutter glasses 400 is open in steps S7 to S9.

The controller 60 writes the right eye image data $RGB_{RIGHT}$ to the display element 200 during the (n+3)th frame period Fn+3 in steps S10 and S11. The display element 200 holds the right eye image data $RGB_{RIGHT}$ during the (n+4)th frame period Fn+4.

After the first time t1 has passed from the beginning of the (n+4)th frame period Fn+4, the controller 60 scans the active retarder cell 100 in steps S13 and S14. After the predetermined time corresponding to the sum of the first and second times t1 and t2 has passed from the beginning of the (n+4)th frame period Fn+4, the right eye shutter 41b of the shutter glasses 400 is open in steps S15 to S17.

In the 2D mode, the controller 60 writes data of the 2D image to the display element 200 and scans the active retarder cell 100 during each of frame periods in step S18.

The user may view the 3D image wearing the shutter glasses 400 and may view the 2D image removing the shutter glasses 400

The backlight unit 300 is continuously turned on in the 2D mode. The backlight unit 300 may be continuously turned on or may be periodically turned on or off in the 3D mode.

As described above, the stereoscopic image display according to the embodiment of the invention sequentially scans the lines of the active retarder cell 100 on all of the lines of the display element 200 after the passage of the response delay time of the display element 200, thereby uniformizing the image quality of the 3D image passing through the active retarder cell 100.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display element to which data of a left eye image is written during a data scanning time of the left eye image and data of a right eye image is written during a data scanning time of the right eye image;
   an active retarder cell positioned on a display surface of the display element, the active retarder cell configured to convert a polarization characteristic of light from the display element during an active retarder scanning time; and
   shutter glasses including a left eye shutter and a right eye shutter that are electrically controlled and are alternately opened and closed,
   wherein after a predetermined time has passed from the end of the data scanning time of the left eye image, the active retarder cell starts to be scanned,
   wherein after a predetermined time has passed from the end of the data scanning time of the right eye image, the active retarder cell starts to be scanned.

2. The stereoscopic image display of claim 1, wherein a difference between the data scanning time of the left eye image and the active retarder scanning time is uniform on all of lines of the display element,
   wherein a difference between the data scanning time of the right eye image and the active retarder scanning time is uniform on all of the lines of the display element.

3. The stereoscopic image display of claim 2, wherein the data of the left eye image is written to the display element during an (n+1)th frame period, where n is a positive integer,
   wherein the data of the left eye image written to the display element is hold and the active retarder cell is scanned during an (n+2)th frame period,
   wherein the data of the right eye image is written to the display element during an (n+3)th frame period,
   wherein the data of the right eye image written to the display element is hold and the active retarder cell is scanned during an (n+4)th frame period, 4. The stereoscopic image display of claim 3, wherein after a predetermined first time has passed from the beginning of the (n+2)th frame period, the active retarder cell starts to be scanned,
   wherein after the first time has passed from the beginning of the (n+4)th frame period, the active retarder cell starts to be scanned.

5. The stereoscopic image display of claim 4, wherein the left eye shutter of the shutter glasses is open during the (n+2)th frame period,
   wherein the right eye shutter of the shutter glasses is open during the (n+4)th frame period.

6. The stereoscopic image display of claim 5, wherein after a predetermined time corresponding to a sum of the first time and a predetermined second time has passed from the beginning of the (n+2)th frame period, the left eye shutter of the shutter glasses starts to be opened,
   wherein after the predetermined time corresponding to the sum of the first time and the second time has passed from the beginning of the (n+4)th frame period, the right eye shutter of the shutter glasses starts to be opened.

7. The stereoscopic image display of claim 6, wherein a polarization characteristic of the left eye image passing through the active retarder cell is substantially the same as a polarization characteristic of the right eye image passing through the active retarder cell,
   wherein polarization characteristics of the left eye shutter and the right eye shutter of the shutter glasses are substantially the same as each other.

8. The stereoscopic image display of claim 1, further comprising a backlight unit configured to provide light to the display element.

9. The stereoscopic image display of claim 1, wherein the display element includes a display element of one of a liquid crystal display (LCD), a field emission display (FED), a plasma display panel (PDP), an electroluminescence device (EL), and an electrophoretic display (EPD).

10. A method for driving a stereoscopic image display comprising:
    writing data of a left eye image to a display element during a data scanning time of the left eye image and writing data of a right eye image to the display element during a data scanning time of the right eye image;
    scanning an active retarder cell positioned on a display surface of the display element during an active retarder scanning time to convert a polarization characteristic of light from the display element; and
    electrically controlling a left eye shutter and a right eye shutter of shutter glasses to alternately open and close the left eye shutter and the right eye shutter,
    wherein after a predetermined time has passed from the end of the data scanning time of the left eye image, the active retarder cell starts to be scanned,
    wherein after a predetermined time has passed from the end of the data scanning time of the right eye image, the active retarder cell starts to be scanned.

11. The method of claim 10, wherein a difference between the data scanning time of the left eye image and the active retarder scanning time is uniform on all of lines of the display element,
    wherein a difference between the data scanning time of the right eye image and the active retarder scanning time is uniform on all of the lines of the display element.

12. The method of claim 11, wherein the writing of the data of the left eye image and the data of the right eye image includes:
    writing the data of the left eye image to the display element during an (n+1)th frame period, where n is a positive integer; and
    writing the data of the right eye image to the display element during an (n+3)th frame period.

13. The method of claim 12, wherein the scanning of the active retarder cell includes:
  scanning the active retarder cell during an (n+2)th frame period in which the data of the left eye image written to the display element is hold; and
  scanning the active retarder cell during an (n+4)th frame period in which the data of the right eye image written to the display element is hold.

14. The method of claim 13, wherein after a predetermined first time has passed from the beginning of the (n+2)th frame period, the active retarder cell starts to be scanned,
  wherein after the first time has passed from the beginning of the (n+4)th frame period, the active retarder cell starts to be scanned.

15. The method of claim 14, wherein the alternately opening and closing of the left eye shutter and the right eye shutter includes:
  opening the left eye shutter of the shutter glasses during the (n+2)th frame period; and
  opening the right eye shutter of the shutter glasses during the (n+4)th frame period.

16. The method of claim 15, wherein after a predetermined time corresponding to a sum of the first time and a predetermined second time has passed from the beginning of the (n+2)th frame period, the left eye shutter of the shutter glasses starts to be opened,
  wherein after the predetermined time corresponding to the sum of the first time and the second time has passed from the beginning of the (n+4)th frame period, the right eye shutter of the shutter glasses starts to be opened.

17. The method of claim 16, wherein a polarization characteristic of the left eye image passing through the active retarder cell is substantially the same as a polarization characteristic of the right eye image passing through the active retarder cell,
  wherein polarization characteristics of the left eye shutter and the right eye shutter of the shutter glasses are substantially the same as each other.

* * * * *